United States Patent [19]

Kawamura et al.

[11] 4,299,463
[45] Nov. 10, 1981

[54] DISPLAY DEVICE FOR CAMERA

[75] Inventors: Masaharu Kawamura, Kawasaki; Yoshihiro Shigeta, Tokyo, both of Japan

[73] Assignee: Canon Kabushiki Kaisha, Tokyo, Japan

[21] Appl. No.: 80,798

[22] Filed: Sep. 28, 1979

[30] Foreign Application Priority Data

Oct. 5, 1978 [JP] Japan .................. 53-122976

[51] Int. Cl.³ ...................... G03B 15/05; G03B 17/20
[52] U.S. Cl. .................................. 354/127; 354/149; 354/289
[58] Field of Search ............... 354/127, 128, 139, 149, 354/289, 273, 32-34, 60 F, 60 L, 53

[56] References Cited

U.S. PATENT DOCUMENTS 3,515,047 6/1970 Hahn .................................. 354/128
4,200,370 4/1980 Aizawa et al. .................. 354/139 X Primary Examiner—L. T. Hix
Assistant Examiner—William B. Perkey
Attorney, Agent, or Firm—Toren, McGeady and Stanger

[57] ABSTRACT

In the disclosed system, a camera of the type which manually presets a diaphragm aperture and particularly for a camera which operates with a computer flash device. For flash operation, the aperture of such a camera must be set at a value suitable for the flash device. A signal representative of an aperture value suitable for the computer flash device and a signal representative of a preset aperture value are compared and, when these two values coincide with each other, the coincidence is displayed by a display device arranged within the view finder to let the photographer know that the camera has been set at an aperture value required for flash photography.

9 Claims, 7 Drawing Figures

DISPLAY DEVICE FOR CAMERA

BACKGROUND OF THE INVENTION

1. Field of the Invention

This invention relates to flash camera systems and cameras, and more particularly, to systems and cameras which, when they operate with an automatic flash, displays completion of the charging of the flash device and setting of an aperture preset value required for automatic light adjustment.

2. Description of the Prior Art

In order to obtain a correct exposure during flash operation with a computer flash device, the aperture value of the camera must be adjusted beforehand to a value suitable for the light adjusting characteristic of the computer flash unit to be used. Therefore, known apparatuses have been constructed to allow the flash unit itself to produce information on an aperture value for flash operation and to automatically adjust the aperture value of a camera to the desired value. One example of such arrangement was disclosed by a U.S. Pat. No. 4,047,194. The device disclosed by this U.S. patent is usable with a camera of the type provided with an automatic aperture adjusting device and must have its aperture manually adjusted. In a camera of the type requiring a manually set diaphragm aperture, therefore, the preset aperture of the camera must be adjusted beforehand to the aperture value suitable for the accompanying computer flash unit. If the preset aperture of the camera is set at a value not suitable for the flash device, improper exposure would result from such erroneous setting. Further, proposals have been made for flash devices of the type that permit selection of a desired aperture value from a plurality of flash aperture values in carrying out a flash operation. In a flash device of this type, it is necessary to have the preset aperture value of the camera and the selected aperture value of the flash device coincide with each other. However, with a flash device of this type, aperture value selecting operation on the flash device and an aperture presetting operation on the camera must be carried out manually, and separately from each other. Accordingly, there is a great probability of having two different aperture values erroneously set by these two separate operations and such erroneous aperture value setting has caused improper exposures.

SUMMARY OF THE INVENTION

It is an object of this invention to provide a display device which compares an aperture value selected by a flash device with a preset aperture value of a camera and displays an indication only when the two values coincide with each other to ensure accurate presetting of the diaphragm aperture of the camera even where a flash operation is carried out with a computer flash device used in combination with a camera of a manual aperture presetting type.

It is another object of this invention to provide a display device which is arranged to drive a means for displaying completion of a charging process on the main capacitor of a flash device when the preset aperture value of the camera and the selected aperture value of the flash device coincide with each other, and which is thus arranged to display not only correct aperture setting of the camera but also completion of a charging process on the main capacitor of the flash device.

These and further objects, features and advantages of the invention will become apparent from the following detailed description of preferred embodiments thereof taken in connection with the accompanying drawings.

DESCRIPTION OF THE PREFERRED EMBODIMENTS

Figure 1:
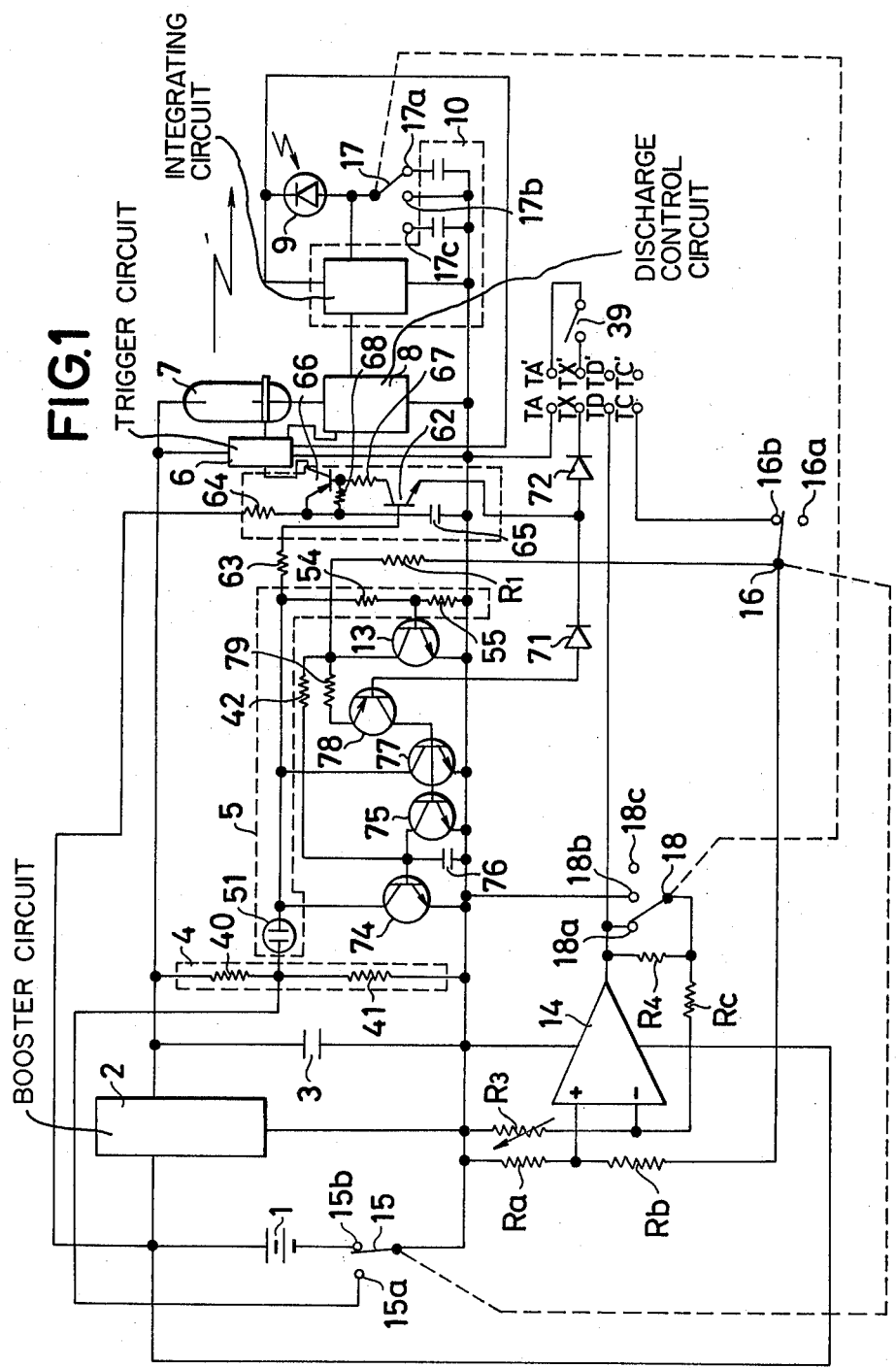
FIG. 1 is a circuit diagram showing an example of an automatic light adjusting flash device to be mounted on a camera so as to form a system embodying features of the present invention.

FIG. 1 is a circuit diagram showing an example of an automatic light adjusting flash devide to be mounted on the camera embodying the present invention. This particular flash device was disclosed by a Japanese Patent Application No. Sho 51-108306 which was filed by the same assignee as that of the present invention. In FIG. 1, the flash device comprises a power source 1; a booster circuit 2 arranged to boost the voltage of the power source 1; a main capacitor 3 for accumulating a flashing energy therein; and a voltage detection circuit 4 for detecting voltage between terminals of the main capacitor 3. The voltage detecting circuit 4 consists of voltage dividing resistors 40 and 41. A reference numeral 5 indicates a known display circuit which consists of a neon tube, etc. and is arranged to display completion of a charging process on the main capacitor 3 by detecting it when the main capacitor 3 is charged up to a predetermined voltage. The details of the display circuit 5 are well known and therefore are omitted from description herein.

Figure 5:
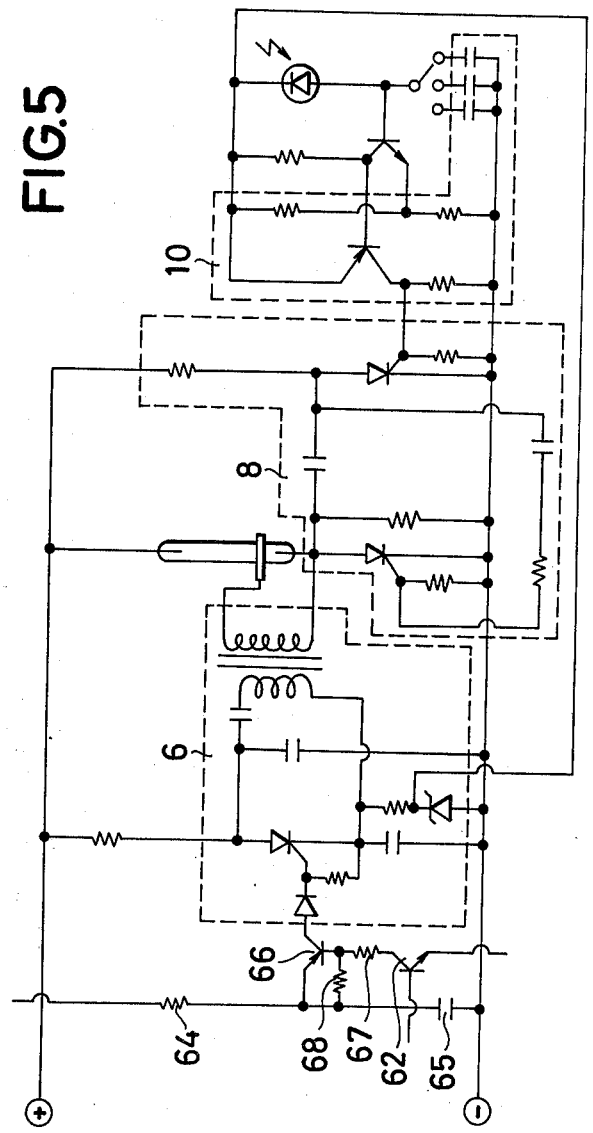
FIG. 5 is a circuit diagram showing the details of circuits 6, 8 and 10 shown in FIG. 1.

A trigger circuit 6 is arranged as shown in FIG. 5. Since the trigger circuit does not directly relate to the present invention, the details thereof are omitted from description herein. However, a circuit 61 controls the operation of the trigger circuit 6 and is arranged as follows: The base of a transistor 62 is connected to the display circuit 5 through a resistor 63. The emitter of the transistor 62 is connected to a terminal TX through a diode 72. The collector of the transistor 62 is connected to the base of a transistor 66 through a resistor 67. The collector of the transistor 66 is connected to the trigger circuit 6. Further, the emitter of the transistor 66 is connected to a connection point between a resistor 64 connected in series with the power source 1 and the capacitor 65 while this connecting point is connected to the base of the transistor 66 through a resistor 68. With the trigger circuit operation control circuit 61 arranged in the above described manner, it allows the trigger circuit 6 to operate only when a synchronizing contact point 39 is turned on while the display circuit is in an operative state and transistors 74 and 77 which will be described hereinafter are off.

A reference number 7 indicates a flash discharge tube which generates a flash of light in response to a trigger signal from the trigger circuit. A known discharge control circuit 8 is connected in series with the flash discharge tube 7. The discharge control circuit 8 is composed of a thyristor connected in series with the discharge tube 7, a commutation capacitor, etc. Since this circuit does not directly relate to the present invention, details thereof are omitted from description herein. However, the structural arrangement of this circuit is as shown in FIG. 5.

A light sensitive element 9 in the form of a photo cell or the like is arranged to receive reflected light derived from the flash of light generated by the flash discharge tube 7. The output of the light sensitive element 9 is integrated by an integration or integrating circuit 10 which in combination with the light sensitive element 9 forms a known light adjusting circuit and an aperture information input circuit arranged to supply information on an aperture value required for flash photography. Aperture information corresponding to each of different aperture values is arranged to be supplied to the light adjusting circuit by making the integration element of the light adjusting circuit variable.

A transistor 13 arranged to turn on by lighting of the neon tube of the display circuit 5 has its base connected to the display circuit 5. During a flash operation, a resistor R1 transmits a flash photography selection signal to the control circuit of the camera to automatically adjust the diaphragm aperture to a value suitable for flash photography. Resistors Ra and Rb have very high resistance values as compared with the resistor R1. A flash photography aperture control signal forming circuit is formed by an operational amplifier 14. A variable resistor R3 is set to the film sensitivity and a resistor R4 is arranged to supply information on a selected aperture to the flash photography aperture control signal forming circuit when a given aperture value is selected by the aperture information input circuit 10.

A power source switch 15 for the flash device is selectively connected to its terminal 15a or 15b while a selector switch 16 is selectively connected with its terminal 16a or 16b in response to the operation of the power source switch 15. Another selector switch 17 operates the light adjusting circuit and selects an aperture value during light adjustment by selectively connecting to its terminals 17a, 17b or 17c. A selector switch 18 selectively connects to its terminals 18a, 18b or 18c in response to the operation of the switch 17. The terminal 15a when contacted by the switch 15 establishes EE photographic operation and the terminal 15b when contacted serves for changing the aperture of the camera to an aperture value suitable for flash photography. A symbol TA indicates a ground terminal; TX indicates a synchronizing contact connecting terminal; TD indicates a terminal for transmission of aperture control information; and TC indicates a terminal for transmission of a photographic mode selector signal.

Resistors 40 and 41 are arranged to control lighting of the neon tube 5 by dividing the charge voltage of the main capacitor 3. A resistor 42 is connected to the collector of the transistor 13 and also to the base of an erroneous action preventing transistor 74, the collector of which is connected to the lower voltage end of the neon tube 51. The base of a transistor 78 is connected to the terminal TX through diodes 71 and 72. The emitter of the transistor 78 is connected to the collector of the transistor 13 through a high resistance resistor 79 while the collector of the transistor 78 is connected to the bases of transistors 75 and 77. The collector of the transistor 75 is connected to the base of the transistor 74 while the collector of the transistor 77 is connected to the collector of the transistor 74.

Assuming that the APEX value of an aperture value selected by the switch 17 at the flash device is AV', the operational amplifier 14 is such that the resistance values of the resistors Ra, Rb, Rc, etc. are set to produce an output of $$V_{REF}\left(1 - \frac{AV' + 0.5}{16}\right).$$

Figure 2:
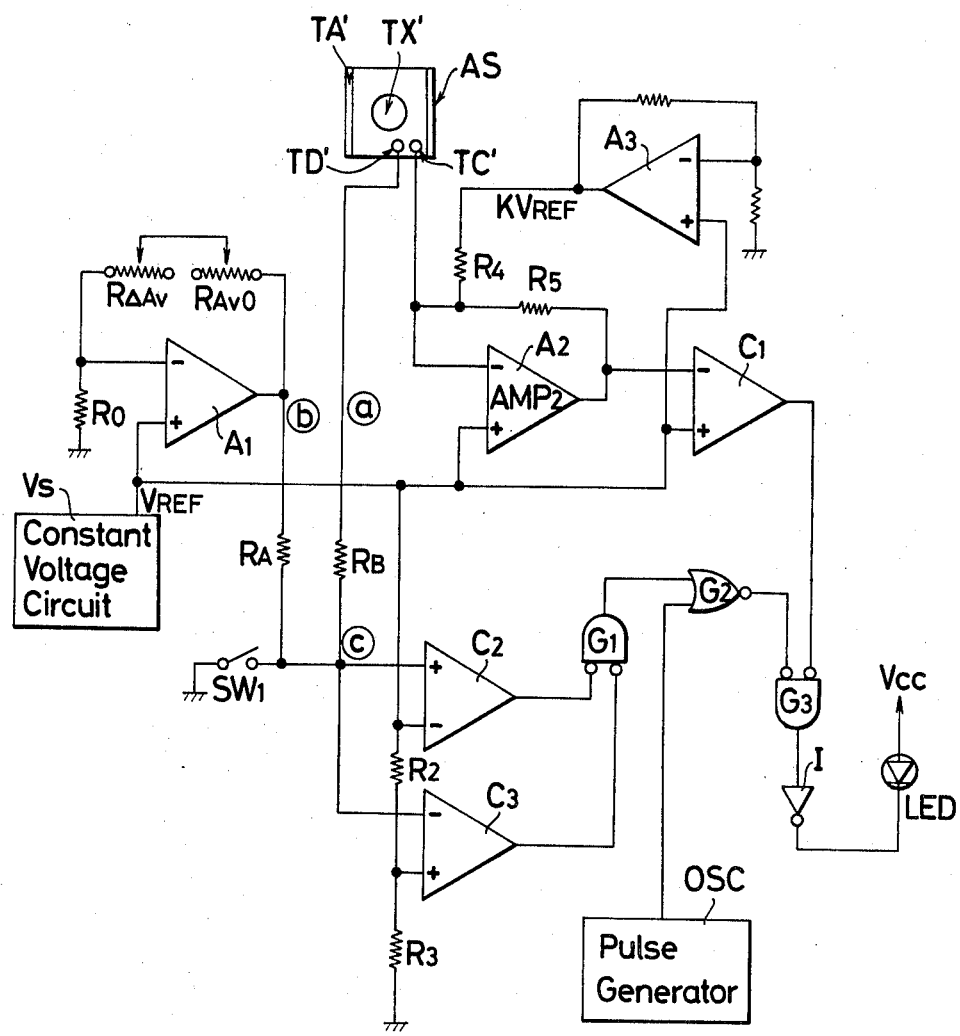
FIG. 2 is a circuit diagram showing a display circuit in a camera embodying features of the invention.

In FIG. 2 which shows a display circuit of a camera embodying the present invention, reference symbols TA', TX', TD' and TC' indicate terminals which are respectively connectable to the terminals TA, TX, TD and TC shown in FIG. 1 and are arranged on an accessory shoe; A2 and A3 indicate operational amplifiers; R4 and R5 indicate resistors; and C1 indicates a comparator. A charging completion indicating signal forming circuit of the flash device is formed by the operational amplifiers, the resistors and the comparator above mentioned. The non-inverting input terminal of the operational amplifier A3 is connected to a constant voltage circuit VS which produces a predetermined voltage $V_{REF}$ and a constant voltage $KV_{REF}$ is produced from the output terminal of the operational amplifier A3. The non-inverting input terminal of the operational amplifier A2 is connected to the constant voltage circuit VS while the inverting input terminal thereof is connected to the resistor R1 and the transistor 13 of the flash device shown in FIG. 1 through the terminals TC' and TC. A resistor R5 is connected in the feedback route of the operational amplifier A2. Meanwhile, the output of the amplifier A3 is applied to the inverting input terminal of the amplifier A2 through the resistor R4.

With the amplifiers A2 and A3 of the charging completion indicating signal forming circuit being connected in the above stated manner, when the main capacitor has not been completely charged and the transistor 13 is off as will be described hereinafter, the output of the amplifier A2 exhibits a voltage lower than the voltage $V_{REF}$ impressed on the non-inverting input terminal thereof and exhibits a higher voltage than the voltage $V_{REF}$ only when the transistor 13 is turned on with a charging process on the main capacitor having been completed. A comparator C1 therefore produces a low level signal (hereinafter will be called a "0" signal) when the charging process on the main capacitor has been completed and produces a high level signal (hereinafter will be called a "1" signal) when the charging process on the main capacitor has not been completed. A signal representing completion of the charging process on the main capacitor is formed in this manner.

A preset aperture signal forming circuit of the camera is composed of an operational amplifier A1 and a resistor $R_0$ and variable resistors $R_{\Delta AV}$ and $R_{AVO}$. The non-inverting input terminal of the operational amplifier A1 is connected to the output terminal of the constant voltage circuit $V_S$, while a series circuit composed of the resistors $R_{\Delta AV}$ and $R_{AVO}$ is connected in the feedback path of the amplifier A1. The resistors $R_{\Delta AV}$ and $R_{AVO}$ are interlocked with an aperture presetting mechanism shown in FIG. 3.

Figure 3:
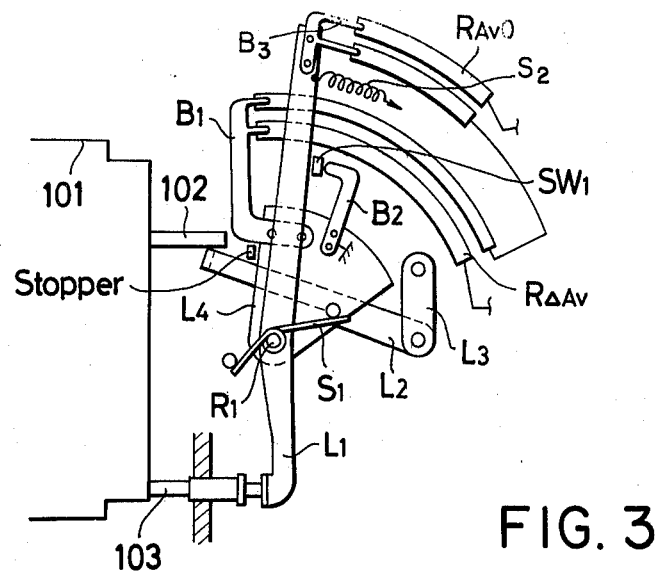
FIG. 3 is an illustration showing an example of the structural arrangement of an aperture presetting mechanism in the camera embodying the present invention.

The presetting mechanism of FIG. 3 includes a mount 101 of a lens barrel; an aperture signal pin 102, and a full-open F-number signal pin. The aperture signal pin 102 is arranged to rotate together with the stop ring of a lens to transmit to a camera body information on the number of steps the lens is stopped down from its full-open F-number. A full-open F-number signal pin 103 is arranged to transmit information on the full-open F-number of the lens to the camera body when the lens is mounted on the camera body. The rotation of the aperture signal pin 102 is transmitted to a brush B1 through levers L2, L3 and L4 so as to change the resistance value of the resistor $R_{\Delta AV}$ which is provided for setting the number of stop down steps. The full-open F-number signal pin 103 transmits the information concerning the full-open F-number of the lens to a brush B3 through a lever L1 to adjust the resistance value of the resistor $R_{AVO}$ which is provided for setting a full-open F-number. Since the resistors $R_{AVO}$ and $R_{\Delta AV}$ are interlocked with the aperture presetting mechanism in this manner, the full-open F-number AVO of the lens is set by the resistor $R_{AVO}$ and the number of stop down steps $\Delta AV$ by the resistor $R_{\Delta AV}$. With the values $\Delta AV$ and AVO set at the resistors $R_{\Delta AV}$ and $R_{AVO}$ in this manner, the resistance value of the series circuit formed by the resistors $R_{\Delta AV}$ and $R_{AVO}$ becomes $AVO+\Delta AV=AV$, which is a resistance value corresponding to a preset aperture value.

Because the aperture signal forming circuit is connected in the manner as described in the foregoing, the aperture signal forming circuit produces an output corresponding to the preset aperture value AV. Further, the constant of the circuit elements of this circuit is arranged to have the output of the amplifier A1 become $$V_{REF}\left(1 + \frac{AV}{16}\right)$$

when a preset aperture value is AV. The reference symbols $R_A$, $R_B$, R2 and R3 indicate resistors and C2 and C3 indicate comparators forming a window comparator. These circuits form a coincidence detecting circuit which is arranged to detect coincidence between an aperture value set at the flash device and an actually preset aperture value of the camera. The resistor $R_A$ is connected between the output terminal of the amplifier A1, the non-inverting input terminal of the comparator C2 and the inverting input terminal of the comparator C3. The resistor R3 is connected between the terminal TD', the non-inverting input terminal of the comparator C2 and the inversion input terminal of the comparator C3.

With this connection arrangement, the resistors $R_A$ and $R_B$ combine the output $$V_{REF}\left(1 + \frac{AV}{16}\right)$$

of the preset aperture signal forming circuit of the camera and the output $$V_{REF}\left(1 - \frac{AV + 0.5}{16}\right)$$

of the flash photography aperture control signal forming circuit which is supplied through the terminal TD'. A composite value thus obtained is transmitted to the non-inverting input terminal of the comparator C2 and the inverting input terminal of the comparator C3. Assuming that the potential $$V_{REF}\left(1 - \frac{AV + 0.5}{16}\right)$$

at a point a is Va and the potential $$V_{REF}\left(1 + \frac{AV}{16}\right)$$

at a point b is Vb, the potential Vc at a point c is then $$Va + (Vb - Vb)\frac{R_A}{R_A + R_B}.$$

Then, there obtains the following relation:

$$V_{REF}\left(1 - \frac{AV + 0.5}{16}\right) + \left[V_{REF}\left(1 + \frac{AV}{16}\right) - V_{REF}\left(1 - \frac{AV + 0.5}{16}\right)\right]\frac{R_A}{R_A + R_B} =$$

$$V_{REF}\left(1 + \frac{AV - AV - 0.5}{32}\right) \text{ (assuming that } R_A = R_B\text{).}$$

Figure 4A:
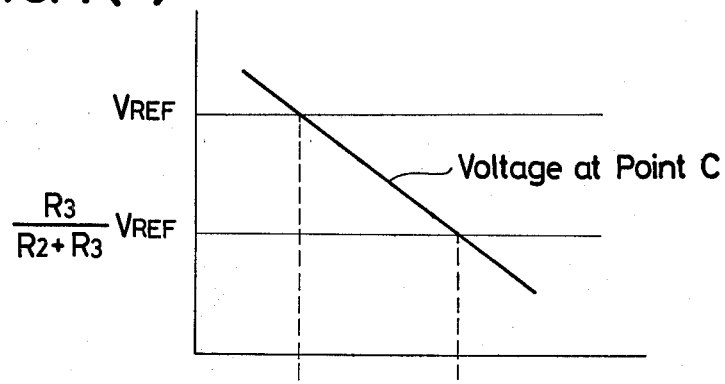
FIGS. 4a–4c is a waveform chart showing the operation of a window comparator.
Figure 4B:
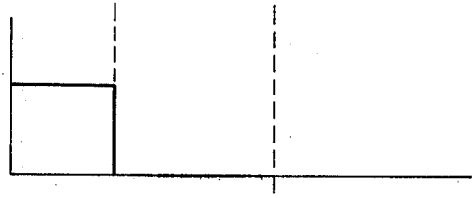
Figure 4C:

The voltage thus obtained is transmitted to the non-inverting input terminal of the comparator C2 and to the inverting input terminal of the comparator C3. Further, the resistors $2 and R3 are connected in series and serve as voltage divider for the output $V_{REF}$ of the constant voltage circuit VS. The inverting input terminal of the comparator C2 has the voltage $V_{REF}$ impressed thereon while the non-inverting input terminal of the comparator C3 has the divided voltage $$V_{REF}\frac{R3}{R2 + R3}$$

of the resistors R2 and R3 impressed thereon. Accordingly, the output terminal of the comparator C2 produces a "1" signal when the potential at the point c is higher than the voltage $V_{REF}$ as shown in FIG. 4(a) and (b). The output terminal of the comparator C3 produces a "1" signal when the voltage at the point c is lower than the voltage $$V_{REF} \times \frac{R3}{R2 + R3}$$

as shown in FIG. 4(a) and (c). In other words, when the voltage at the point c is between $$V_{REF} \text{ and } V_{REF} \times \frac{R3}{R2 + R3},$$

both the comparators C2 and C3 produce "0" signals and produce "1" signals at all other times except this time.

Assuming that the ratio of the resistor R2 to the resistor R3 is set at 1:31, there obtains a relation of $V_{REF} \geq$ voltage at the point $c \geq (31/32)V_{REF}$ prevails. Accordingly, both the comparators C2 and C3 produce "0" signals only when $0.5 \geq AV - AV' \geq -0.5$ and coincidence is detected with an accuracy within 0.5 step, i.e. within a range of difference 0.5 between AV and AV'.

AND gates G1 and G3 have inverters connected to their input terminals. Symbols G2 indicates a NOR gate and I an inverter. A light emitting diode LED is arranged within a view finder. These gate circuits form a driving circuit for the light emitting diode LED. A pulse oscillator OSC generate pulses of ¼ duty cycle at 4 Hz; and a switch SW1 is turned off when a lens of the full-open light measuring type provided with an aperture signal pin is mounted on the camera and is turned on when a lens of the stop down light measuring type not provided with an aperture signal pin is mounted on the camera. The circuits shown in FIGS. 1 and 2 operate in the following manner:

When the flash device shown in FIG. 1 is mounted on the camera, the terminals TA and TX are connected respectively to terminals TA' and TX' and the auxiliary terminals TC and TD are respectively connected to the terminals TC' and TD'. In this condition, when an aperture value required for flash photography is selected by the switch 17, the switch 18 is connected to one of the contacts 18a through 18c. Following this, when the power switch 15 is connected to the contact point 15b, the switch 16 which is interlocked with the power switch 15 is connected to the contact 16b. These progresses connect the power source 1 to the booster circuit to boost its voltage. The boosted voltage is impressed on the main capacitor 3 to charge the capacitor 3.

The charge status of the capacitor 3 is detected by the detection circuit 4. When the main capacitor 3 is charged with a sufficient electric charge, the neon tube 51 provided within the display circuit 5 lights up to turn on the transistor 13. Since the switch 16 is set to the contact 16b by the power switch 15, and the transistor 13 is turned on, a voltage from the terminal TC' on the camera impresses a current flow toward the emitter of the transistor 13 through the resistor R1. As mentioned in the foregoing, this causes the output of the operational amplifier A2 to become higher than the constant voltage $V_{REF}$ and the comparator C1 produces a "0" signal.

Meanwhile, since the voltage $V_{REF}$ is supplied from the terminal TC' through the switch 16 to the resistors Ra and Rb of the flash photography aperture control signal forming circuit shown in FIG. 1, the operational amplifier 14 produces an aperture value signal. Assuming that the aperture value selected by the switch 17 is AV', the operational amplifier 14 produces an output $$V_{REF}\left(1 - \frac{AV' + 0.5}{16}\right)$$

as mentioned in the foregoing. The above stated aperture value signal is transmitted through the terminals TD and TD' to the camera. Then, coincidence between the value of this aperture value signal and a preset aperture value of the camera is detected. If the preset aperture value of the camera is AV, the amplifier A1 produces an output of $$V_{REF}\left(1 + \frac{AV}{16}\right).$$

Then, this output voltage and the voltage $$V_{REF}\left(1 - \frac{AV' + 0.5}{16}\right)$$

coming from the flash device are combined by the resistors $R_A$ and $R_B$. A composite voltage thus obtained is compared with a reference voltage by the window comparator C2 and C3.

If the preset aperture value AV and the selected aperture value AV' of the flash device differ from each other by more than 0.5 steps, either one of the outputs of the comparators C2 and C3 produces a "1" signal as mentioned in the foregoing. Therefore, the AND gate G1 produces a "0" signal. Then, the NOR gate G2 transmits the pulses from the pulse oscillator OSC to the gate circuit G3. Since a charging process on the main capacitor has been completed as mentioned, and a "0" signal is produced by the comparator C1, a "1" signal is impressed through the inverter on one of the input terminals of the AND gate G3. Therefore, the pulses from the pulse oscillator OSC are transmitted to the light emitting diode LED through the gate G3 and the inverter I to cause the light emitting diode LED to flicker in synchronism with the pulses. In other words, completion of the charging process on the main capacitor is displayed by the flickering action of the light emitting diode LED within the view finder.

In this condition, when a stop ring which is not shown in rotation to change the resistance value of the resistor $R_{\Delta AV}$ and thus to change the preset aperture value AV, the output of the operational amplifier A1 also changes. In this process of setting the preset aperture value AV, when the difference between the preset aperture value AV and the selected aperture value AV' of the flash device reaches 0.5 steps or less, both the comparators C2 and C3 produce "0" signals. Then, this causes "1" signals to be impressed by the inverter on the input terminal of the AND gate G1. The AND gate G1, therefore, produces a "1" signal. The NOR gate G2 then produces a "0" signal. Then, a "1" signal is transmitted to one of the input terminals of the AND gate G3 through the inverter. This causes the AND gate G3 to produce a "1" signal which in turn causes the light emitting diode to light up continuously to indicate that the preset aperture value of the camera coincides with the flash photography aperture value selected at the flash device.

When charging of the main capacitor has not been completed, the output of the amplifier A2 is lower than the constant voltage $V_{REF}$ and the comparator C1 produces a "1" signal as mentioned in the foregoing. In that case, therefore, a "0" signals is impressed on one of the input terminals of the gate G3 through the inverter; the output of the inverter I then becomes a "1" signal and the light emitting diode does not light up.

When a stop down light measuring type lens having no aperture signal pin is employed, the lever L4 shown in FIG. 3 is moved into contact with a stopper ST by a spring S1 and is thus rotated counterclockwise. With the lever L4 rotated counterclockwise, the contact of the switch SW1 is brought into contact with a contact piece B2 and the switch SW1 is thus turned on. Then, the information signal is grounded as shown in FIG. 2. Therefore, the non-inverting input terminal of the comparator C2 and the inverting input terminal of the comparator C3 have "0" signals impressed thereon. The output of the gate G1 is then "0" and an alternating signal from the oscillator OSC is produced by the output terminal of the gate G2. Therefore, when the charging process of the flash device has been completed, the light emitting diode LED flickers to warn the photographer that a lens of the above stated type is in use.

As described in the foregoing, the display device of the present invention displays coincidence of an aperture value selected by a computer flash device for flash photography with a preset aperture value of a camera within a view finder or the like thereof. Even with a camera of the manual aperture setting type used in combination with a computer flash device, it is possible to know whether the preset aperture value of the camera is set at the same value as the aperture value required for the use of the flash device. In accordance with the present invention, therefore, incorrect aperture value setting of the camera can be prevented to ensure a correct flash operation. Further, since the above is to be displayed by means for displaying completion of a charging process on the main capacitor of the flash device, both the completion of the charging process and the setting of the preset aperture value can be indicated thereby. This feature of the invention is highly advantageous.

While embodiments of the invention have been described in detail, it will be obvious to those skilled in the art that the invention can be embodied otherwise without departing from its spirit and scope.

What is claimed is:

1. A camera system comprising:
   (A) a flash device including:
      flash photography aperture value signal forming means for producing a first aperture value signal; and
   (B) a camera including:
      (a) aperture presetting means for presetting an aperture value and for producing a second aperture value signal;
      (b) a detection circuit for detecting the aperture value signal produced by said flash photography aperture value signal forming means and the second aperture value signal representative of an aperture value set by said aperture presetting means, said detection circuit being arranged to produce a coincidence signal when said two aperture value signals coincide with each other; and
      (c) an indicating circuit for indicating an aperture presetting status in response to said coincidence signal produced by said detection circuit.

2. A camera system comprising:
   (A) a flash device including:
      (a) flash photography aperture value selecting means
      (b) flash photography aperture value signal forming means for producing a first aperture value signal corresponding to an aperture value selected by said flash photography aperture value selecting means; and
   (B) a camera including:
      (a) aperture presetting means for presetting an aperture value and for producing a second aperture value signal;
      (b) a detection circuit for detecting the first aperture value signal produced by said flash photography aperture value signal forming means and the second aperture value signal representative of an aperture value set by said aperture presetting means, said detection circuit being arranged to produce a coincidence signal when said two aperture value signals coincide with each other, and
      (c) an indicating circuit for indicating an aperture presetting status in response to said coincidence signal produced by said detection circuit.

3. A camera system according to claim 1 or claim 2, wherein said flash device includes a main capacitor and a charging completion signal forming circuit for detecting the status of a charging process on said main capacitor and for producing a charging completion signal when said main capacitor reaches a predetermined charged state; said indicating circuit being arranged to become operative in response to said charging completion signal.

4. A camera system comprising:
   (A) a indicating flash device including:
      (a) accumulating means for accumulating flash energy;
      (b) a ready-for-flash signal forming means for detecting the level of the energy accumulated in said accumulating means and for producing a ready-for-flash signal when said energy level reaches a predetermined value; and
      (c) flash photography aperture value signal forming means for forming a first aperture value signal representative of an aperture value required for flash photography; and
   (B) a camera including:
      (a) aperture presetting means for presetting an aperture value forming a second aperture value signal representative of an aperture value;
      (b) a detection circuit for detecting the first aperture value signal produced by said flash photography aperture value signal forming means and the second signal representative of the aperture value set by said aperture presetting means, said detection circuit being arranged to produce a coincidence signal when said two aperture value signals coincide with each other;
      (c) a display circuit which displays a ready-for-flash signal and
      (d) said display circuit being arranged to vary the display state thereof in response to said coincidence signal and thus to indicate that the aperture value set by said aperture presetting means has reached the aperture value required for flash photography.

5. A camera system according to claim 4, wherein said display circuit includes pulse signal forming means, display means, and driving means for driving said display means on a periodic basis according to the pulses produced by said pulse signal forming means and for continuously driving said display means in response to said ready-for-flash signal and said coincidence signal.

6. A camera usable in combination with a flash device having flash photography aperture value information producing means for producing aperture value information representing a first aperture value for flash photography, said camera comprising:
(a) aperture presetting means for presetting an aperture value and for producing preset aperture value information; and
(b) indicating means responsive to said flash photography aperture value information and the preset aperture value information from said aperture presetting means for indicating coincidence when said two aperture values coincide.

7. A camera usable in combination with a flash device having flash photography aperture value signal forming means for producing a flash photography aperture value signal, said camera comprising:
(a) aperture presetting means for presetting an aperture value and for producing an aperture value signal;
(b) a detection circuit for detecting an aperture value signal produced by said flash photography aperture value signal forming means and an aperture value signal representative of an aperture value set by said aperture presetting means, said detection circuit being arranged to produce a coincidence signal when said two aperture value signals coincide; and
(c) an indicating circuit which displays an aperture presetting status in response to the coincidence signal produced by said detection circuit.

8. A camera usable with a flash device having flash photography aperture value signal forming means for producing a first aperture value signal representing an aperture value required for flash photography and ready-for-flash signal forming means for producing a ready-for-flash signal when the level of energy accumulated in the flash energy accumulating means reaches a predetermined value, said camera comprising:

(a) indicating means for indicating a ready condition for flash in response to said ready-for-flash signal;
(b) aperture presetting means for presetting an aperture value and for producing a second aperture value signal representative of the aperture value;
(c) a detection circuit for detecting said first aperture value signal for flash photography and said second aperture value signal representative of the aperture value prreset by said aperture presetting means, said detection circuit being arranged to produce a coincidence signal when said two aperture value signals coincide; and
(d) an indicating control circuit for varying the indicating mode of said indicating means in response to said coincidence signal to indicate that the aperture value set by said aperture presetting means coincides with said aperture value required for flash photography.

9. A camera system comprising:
(a) aperture presetting means for presetting an aperture value and for producing an aperture value signal representative of the preset aperture value;
(b) flash photography aperture value forming means for producing a flash photography aperture value signal representative of an aperture value required for flash photography;
(c) a detection circuit for detecting said flash photography aperture value signal and the aperture value signal representative of an aperture value set by said aperture presetting means, said detection circuit being arranged to produce a coincidence signal when said two aperture value signals coincide; and
(d) indicating means for indicating, in response to said coincidence signal, that the aperture has been preset at an aperture value required for flash photography.

* * * * *